United States Patent
Schwalb et al.

(10) Patent No.: US 10,997,864 B2
(45) Date of Patent: May 4, 2021

(54) CAR-TO-INFRASTRUCTURE PARKING SPACE RECOGNITION SYSTEM FOR A MOTOR VEHICLE

(71) Applicant: Valeo Schalter und Sensoren GmbH, Bietigheim-Bissingen (DE)

(72) Inventors: Tobias Schwalb, Bietigheim-Bissingen (DE); Frank Blinkle, Bietigheim-Bissingen (DE); Stephan Haenisch, Bietigheim-Bissingen (DE); Tobias Bieler, Bietigheim-Bissingen (DE)

(73) Assignee: Valeo Schalter und Sensoren GmbH, Bietigheim-Bissingen (DE)

( * ) Notice: Subject to any disclaimer, the term of this patent is extended or adjusted under 35 U.S.C. 154(b) by 0 days.

(21) Appl. No.: 16/468,799

(22) PCT Filed: Nov. 27, 2017

(86) PCT No.: PCT/EP2017/080497
§ 371 (c)(1),
(2) Date: Jun. 12, 2019

(87) PCT Pub. No.: WO2018/108504
PCT Pub. Date: Jun. 21, 2018

(65) Prior Publication Data
US 2019/0371181 A1 Dec. 5, 2019

(30) Foreign Application Priority Data
Dec. 12, 2016 (DE) ...................... 10 2016 124 060.5

(51) Int. Cl.
*G08G 1/16* (2006.01)
*G06K 9/00* (2006.01)

(52) U.S. Cl.
CPC ......... *G08G 1/168* (2013.01); *G06K 9/00812* (2013.01); *B60R 2300/806* (2013.01)

(58) Field of Classification Search
CPC ................ G08G 1/168; G06K 9/00812; B60R 2300/806; B62D 15/027; B62D 15/02;
(Continued)

(56) References Cited

U.S. PATENT DOCUMENTS 10,783,786 B2 * 9/2020 Franklin .............. G08G 1/0129
2014/0081476 A1 3/2014 Verdugo-Lara et al.
(Continued)

FOREIGN PATENT DOCUMENTS

DE 02008004633 A1 7/2009
DE 02009046726 A1 5/2011
(Continued)

OTHER PUBLICATIONS

International Search Report and Written Opinion issued in corresponding PCT Application No. PCT/EP2017/080497, dated Mar. 2, 2018 (14 Pages with English Translation of International Search Report).
(Continued)

*Primary Examiner* — Orlando Bousono
*Assistant Examiner* — Anthony D Afrifa-Kyei
(74) *Attorney, Agent, or Firm* — Osha Bergman Watanabe & Burton LLP

(57) ABSTRACT

The invention concerns a parking space recognition system (13) for a motor vehicle (1), with a sensor device (3) that is designed to detect at least one surface (6a, 6b) of at least one object (7a, 7b) in the surroundings of the motor vehicle (1) and extending along a direction of travel (F) of the motor vehicle (1) and with a computing device (8) that is designed to identify a space (9) between two detected surfaces (6a, 6b) extending along the direction of travel (F) as a potential
(Continued)

Figure 1:
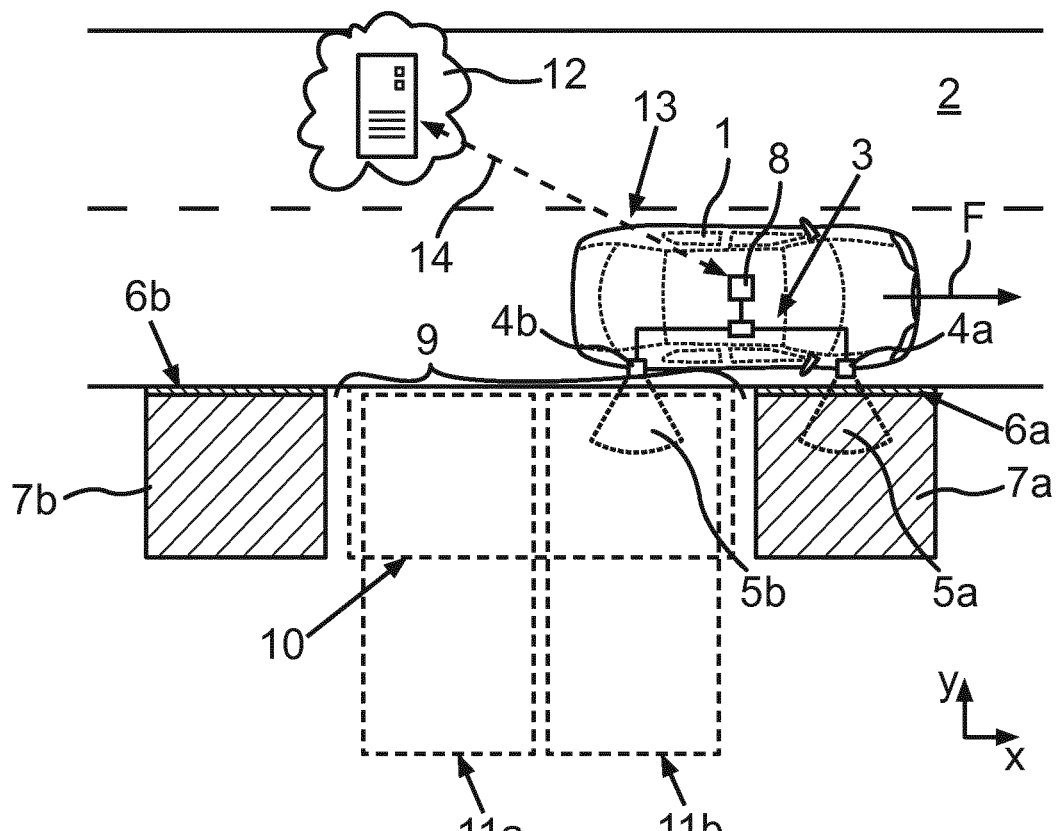

parking space with an associated parking space position, which can be at least one longitudinal parking space (10) or at least one transverse parking spaces (11a, 11b), and with a memory device (12) that is designed to identify the recognized potential parking space as a longitudinal parking space (10) or as a transverse parking space (11a, 11b) or as a potential parking space depending on parking space information stored for the parking space position, in order to increase the accuracy of parking space detection by a motor vehicle (1).

10 Claims, 1 Drawing Sheet

(58) Field of Classification Search
CPC .............. B62D 15/0275; B62D 15/028; B62D 15/0285
See application file for complete search history.

(56) References Cited

U.S. PATENT DOCUMENTS

| | | | |
|---|---|---|---|
| 2014/0292542 A1* | 10/2014 | Bruning | B62D 15/028 340/932.2 |
| 2014/0365108 A1* | 12/2014 | You | B62D 15/0285 701/408 |
| 2016/0207526 A1 | 7/2016 | Franz et al. | |
| 2016/0280263 A1* | 9/2016 | Mori | B62D 15/0285 |
| 2018/0319327 A1* | 11/2018 | Cunningham, III | G08G 1/143 |

FOREIGN PATENT DOCUMENTS

| | | |
|---|---|---|
| DE | 102010022718 A1 | 12/2011 |
| DE | 02014212843 A1 | 1/2016 |

OTHER PUBLICATIONS

German Search Report issued in Corresponding German Application No. 10 2016 124 060.5, dated Sep. 5, 2017 (7 Pages).

* cited by examiner

CAR-TO-INFRASTRUCTURE PARKING SPACE RECOGNITION SYSTEM FOR A MOTOR VEHICLE

The invention concerns a parking space recognition system for a motor vehicle, with a sensor device that is designed to detect at least one surface of at least one object extending along a direction of travel of the motor vehicle in the surroundings of the motor vehicle, and with a computing device that is designed to recognize a space detected between two surfaces extending along the direction of travel as a potential parking space with an associated parking space position that can be or that can accommodate at least one longitudinal parking space or at least one transverse parking space. The invention also concerns a corresponding motor vehicle and a corresponding method for detecting a parking space.

Available parking space recognition systems detect parking spaces as a motor vehicle travels past the parking space. Because the range of the suitable sensors in a direction transverse to the direction of travel is limited, during this the depth of a potential parking space transverse to the direction of travel of the motor vehicle often cannot be detected. Thus, when travelling past a larger potential parking space it may not be determined whether it is one or more longitudinal parking spaces for parking one or more motor vehicles along the direction of travel of the passing motor vehicle or one (particularly wide) or a plurality of transverse parking spaces for parking one or more motor vehicles transverse to the direction of travel of the passing motor vehicle. In this case, the parking space recognition systems cannot in general even use basic information about the corresponding orientation of the parking space or parking spaces from the orientation of parked motor vehicles on spaces adjacent to the parking space, because the ultrasonic sensors that are typically used just cannot detect surfaces transverse to the direction of travel of the motor vehicle in a side region of the motor vehicle. Thus for example, with a plurality of transversely parked adjacent motor vehicles, in addition a space between the individual parked motor vehicles cannot be detected because of the limited resolution of such systems, so that the parking space recognition system with ultrasound only provides very rudimentary information about the potential parking space, namely for example the length thereof along the direction of travel of the motor vehicle.

A method for detecting and selecting a parking space in this context is known from DE 10 2009 046 726 A1, with which first the geometry of the parking space is detected with a contour detecting sensor arrangement, and then a suitable free area is indicated as a possible parking space and a suitable parking space is selected.

It is the object of the invention to increase the accuracy of parking space detection by a motor vehicle.

This object is achieved by the subject matter of the independent patent claims. Advantageous embodiments result from the dependent patent claims, the description and the figures.

The invention concerns a parking space recognition system for a motor vehicle with at least one sensor device and at least one computing device. The sensor device and/or the computing device can each be a device within the vehicle in this case, i.e. a sensor device or a computing device of the motor vehicle. The sensor device is in this case designed to detect at least one surface of at least one object extending along a direction of travel of the motor vehicle in the surroundings of the motor vehicle. A surface extending along the direction of travel can mean here in particular a surface extending essentially parallel to the direction of travel of the motor vehicle, i.e. a surface extending parallel to the direction of travel with a specified maximum deviation from the direction of travel. The specified maximum deviation can in this case be 40 degrees or 20 degrees or 10 degrees, for example. For example, a surface of a flower box, a tree or another, for example parked motor vehicle that is oriented towards the road being traveled by the motor vehicle can be detected by the sensor device.

The computing device is designed in this case to recognize a space between two surfaces extending along the direction of travel (preferably in different positions of the motor vehicle) that are detected by the sensor device as a potential parking space with an associated parking space position. The potential parking space can in this case contain or be at least one longitudinal parking space or alternatively at least one, for example at least two, transverse parking spaces. The recognition of the space between the surfaces can be carried out using a specified criterion in this case. For example, the potential parking space can be recognized as such if the two surfaces are no more than a specified distance from each other and/or are recognized depending on a position of the motor vehicle detected by a position detection system of the motor vehicle, for example while accessing map information. The parking space recognition system can thus comprise at least one position detection system. The surfaces extending along the direction of travel can in this case run essentially parallel to each other, in particular in the above sense.

The computing device thus initially has no knowledge about whether the potential parking space contains a longitudinal parking space or a transverse parking space, and whether consequentially a parking process should be carried out preferably with parking along or transverse to the direction of travel of the motor vehicle when the surfaces are detected. The computing device can be designed to provide information to the memory device about the space recognized as a potential parking space, which for example contains position information.

It is important in this case that the parking space recognition system comprises a memory device, for example a database device, that is designed to identify the potential parking space recognized during detection depending on parking space information stored for the parking space position in the memory device, for example on a map, as a longitudinal parking space with space for parking at least one motor vehicle along the direction of travel of the motor vehicle, i.e. for parking in the longitudinal direction, or as a transverse parking space with space for parking at least one motor vehicle transverse to the direction of travel, i.e. for parking in the transverse direction, or even as a potential parking space that can contain both a longitudinal parking space and a transverse parking space. Therefore, the memory device can also comprise a suitably designed computing unit. The memory device and the computing device described above can be implemented in this case either as one unit or even as separate units. Accordingly, the memory device can also be designed to provide a corresponding lengthwise park signal or a transverse park signal, so that for example a parking or driver assistance device of the motor vehicle receives information about whether the motor should be parked longitudinally or transversely vehicle when parking in the parking space. In this case, providing a further signal can also be provided, which indicates that the memory device is not able to uniquely identify the potential parking space as a longitudinal or transverse parking space. The corresponding driver assistance system or parking assistance system can then output a corresponding indication to the driver, for example depending on the signal, and/or can park the vehicle in the parking space at least partly autonomously, i.e. partly autonomously or fully autonomously.

That has the advantage that a parking space recognition system with a technically simple sensor device that is not capable of detecting a more complex geometry and/or does not have sufficient range to fully detect a complete parking space in the depth thereof perpendicular to the direction of travel of a motor vehicle passing the parking space, can determine the type of parking space by resorting to additional information. Accordingly, the driver can be provided with a corresponding indication or a corresponding partly automatic or fully automatic parking manoeuvre by a parking assistance system of the motor vehicle.

In an advantageous embodiment it is provided that the sensor device comprises or is an ultrasonic sensor device. In this case, corresponding ultrasonic sensors of the sensor device can comprise a detection region that extends in a lateral side region of the motor vehicle in the surroundings of the motor vehicle when viewed in the direction of travel of the motor vehicle.

Especially with a parking space recognition system with an ultrasonic sensor device, the described advantages are particularly pronounced, because ultrasonic sensor devices typically have a range that is not sufficient for full detection of a parking space in the depth thereof transverse to the direction of travel and also surfaces of objects that are transverse to the direction of travel of the motor vehicle can be poorly detected or not detected, so that for example two immediately adjacently parked motor vehicles are not detected as separate objects, but rather as only a single particularly long object correspondingly in the direction of travel of the motor vehicle. Especially here therefore, supplementing the information provided by the sensor device with information provided by the memory device is advantageous.

In a further advantageous embodiment, in this case it is provided that the computing device is designed to identify the space between the two detected surfaces extending along the direction of travel as a transverse parking space alternatively to the recognition thereof as a potential parking space. This can be carried out using specified criteria for example, in particular using a specified maximum size of the space. Thus for example, a space that is smaller than the length of the motor vehicle can be directly recognized as a transverse parking space, because it is out of the question for lengthwise parking of the motor vehicle. In this case, a map can be accessed for example, from which it appears that the space is located in a parking area or at a parking space position of a previously recognized potential parking space. Furthermore, in this embodiment the memory device is actually designed, on the one hand, if the transverse parking space has been or is recognized, to place in the parking space information, for example on the map, for the parking space position that has been recognized as a transverse parking space that the parking space in the parking space position was recognized as a transverse parking space, and on the other hand, if the parking space was or is recognized as a potential parking space, to place in the parking space information for the parking space position that has been recognized as a potential parking space that the parking space in the parking space position has been recognized as a potential parking space. The parking space information can thus be updated depending on the recognition of the parking space. In this case the parking space information can be stored on a map here and in the other described embodiments. Said map can for example include all possible parking spaces or parking areas. Said map can for example include all detected parking spaces with the corresponding length thereof in the direction of travel of a motor vehicle passing the parking space and possibly also the depth transverse to the direction of travel. The parking space information can in this case also comprise respective information about the space, for example the length thereof.

This has the advantage that the parking space information is updated and so the respective parking space information is continuously expanded and brought to the current state, so that the alignment or orientation of the recognized parking space can be determined. For example, in the already described example of two mutually adjacent transverse parking spaces, this can thus be recognized as a potential parking space at a first point in time and this information for the parking space position can be placed in the memory device. At another point in time, it can now be detected by the same or a different motor vehicle that there is a transverse parking space here, for example if one of the two transverse parking spaces is occupied by a parked motor vehicle and thus the detected space between the two surfaces is accordingly smaller, for which reason a longitudinal parking space can be excluded for the parking space position of the potential parking space detected at the first point in time. Accordingly, the memory device can determine that there is transverse parking at the corresponding parking space position and can store in the parking space information for the parking space position that the parking space there is a transverse parking space.

The parking space information can in this case also be updated during manual parking of the motor vehicle in a recognized parking space. In the case of lengthwise parking of the motor vehicle in the recognized parking space, it can be stored in the parking space information that the recognized parking space was recognized as a longitudinal parking space and in the case of transverse parking of the motor vehicle in the recognized parking space it can be stored accordingly in the parking space information that the recognized parking space was recognized as a transverse parking space. Alternatively or additionally, a lateral or longitudinal parking space for a parking space position can also be recognized as such if the actual motor vehicle, i.e. the motor vehicle in which the sensor device and/or the computing device is/are located, is parked transversely or lengthwise at the corresponding parking space position.

This has the advantage that here a particularly reliable recognition of the orientation of the parking space or recognition of the parking space as a lateral or longitudinal parking space is guaranteed.

In a further advantageous embodiment, it is provided that the memory device is designed to store in the parking space information for at least one respective parking space position how often and in particular even when and/or with what confidence a potential parking space and/or a transverse parking space and/or a longitudinal parking space was recognized for the parking space position. Here too the recognition can also be carried out by occupying the parking space with the actual motor vehicle. In this case for example, the confidence is at a maximum. The memory device is in this case further designed to associate the parking space position depending on the stored frequencies and/or the stored times for the recognition of either a transverse parking space or a longitudinal parking space or a potential parking space. In this case, the stored frequencies can be analysed using specified criteria. For example, a parking space that has once been recognized by the computing device as a transverse parking space can always be stored as such, i.e. with maximum confidence, and thereby recognized, whereas the recognition of a longitudinal parking space by the computing device must be corrected by even a single recognition of a transverse parking space in the area of the longitudinal parking space. In particular, corresponding confidence intervals or reliability intervals can be provided, so that a specified frequency for the recognition of a parking space at a parking space position as a transverse parking space and/or a longitudinal parking space is necessary before the memory device identifies the corresponding recognized potential parking space as a lateral or longitudinal parking space.

Thus, in the example that has been mentioned several times above of a potential parking space with a longitudinal parking space or alternatively two transverse parking spaces if it is a longitudinal parking space, a smaller space will never be detected there for said parking space position, i.e. never only a part of the parking space will be detected as a potential parking space. In the case of sufficiently frequent detection of the space in the full length thereof, the presence of a longitudinal parking space can thus be assumed with high confidence and the potential parking space is recognized as a longitudinal parking space. However, even a single detection of the potential parking space as a transverse parking space after a thousand identifications as a potential parking space and a (probable) longitudinal parking space, is sufficient to identify and store the potential parking space as a transverse parking space.

This has the advantage that the reliability of the parking space information in the memory device can be increased. Moreover, a weighting of the respective information used can be achieved flexibly here, which increases the flexibility and reliability of the parking space recognition system.

In this case it is preferably provided that the memory device is designed to associate the parking space position of a potential parking space that is adjacent to a transverse parking space with a transverse parking space and/or to associate a potential parking space that is adjacent to a longitudinal parking space with a longitudinal parking space. This is carried out under the assumption that in most cases multiple adjacent parking spaces generally have the same alignment or orientation.

This has the advantage that overall fewer spaces between the surfaces have to be detected for the indication of a recognized potential parking space. Moreover, here too particularly high accuracy in relation to the position determination of the parking space position is unnecessary. Thus, the robustness and meaningfulness of the parking space recognition system is increased.

In a preferred embodiment, in this case it is provided that the parking space information is stored on a map with at least one further item of map information. In this case, the further item of map information can contain length information and/or depth information for one or more parking spaces, for example. In this case, the length information can contain the extent of the parking space or parking spaces in a longitudinal direction of the motor vehicle passing the parking space or the parking spaces, and the depth information can contain the depth of the parking space or parking spaces in a direction transverse to the direction of travel of the motor vehicle passing the parking space or the parking spaces.

This has the advantage that the parking space can be particularly reliably and simply recognized as a longitudinal or as a transverse parking space. Moreover, parking space information from other sensor devices can thus be stored in the map and in the parking space information. This increases the accuracy of the system still further.

In a further advantageous embodiment, it is provided that the sensor device is designed for automatic, in particular continuous or repeated detection of the space, i.e. a space, and thereby for example a plurality of successive spaces, and the computing device is designed for automatic, in particular continuous or repeated recognition. The automatic detection and the automatic recognition can in this case be coupled to the speed of the motor vehicle, so that for example it is always detected and recognized if the motor vehicle is moving at a speed that is lower than a specified speed limit.

This has the advantage that even if updating the parking space information stored in the memory device is provided, the parking space information is updated using a particularly large amount of data. In this case the parking space information for all parking space positions that the motor vehicle passes are updated. In this case, the amount of data is then limited not only to an area in which the motor vehicle is to be parked, but in principle all parking spaces that the motor vehicle passes are detected and taken into account by the system.

In a further advantageous embodiment, it is provided that the memory device contains or is a memory device that is external to the vehicle. In particular, the parking space recognition system can contain a number of sensor devices that are within the vehicle and computing devices that are within the vehicle, wherein in each case a sensor device and a computing device are associated with a motor vehicle. The memory device that is external to the vehicle is thus a central memory device that is common to the vehicles, as can be implemented for example by the so-called cloud.

This has the advantage that the parking space information can be stored, analysed and updated centrally, so that the spaces detected or the parking spaces recognized by many different sensor devices and computing devices can be taken into account. As a result, a corresponding statistic is improved, and the reliability of the system is increased. The parking space information can then also be stored centrally in a global map with all possible parking spaces or parking areas, so that corresponding parking space information is provided for a respective motor vehicle even in unknown surroundings or surroundings that are no longer traveled, so that a recognized potential parking space can be reliably identified as a longitudinal or transverse parking space.

In another advantageous embodiment of the parking space recognition system, it is provided that the memory device contains or is a memory device within the vehicle. The memory device is thus part of the motor vehicle or is designed to be a part of the motor vehicle to which the sensor device and the computing device also belong.

This has the advantage that the parking space recognition system also functions without a data connection to a memory device that is external to the vehicle and is improved. This is especially because in most cases a motor vehicle is parked in known surroundings, for example in the vicinity of a place of work or in the vicinity of a residential address, and thus one or more parking spaces is/are often recognized for the respective surroundings, in this case in a number of application scenarios there are no disadvantages for a corresponding user associated with the resulting independence from a global system with a memory device that is external to the vehicle.

The invention also concerns a motor vehicle with a parking space recognition system, in particular a motor vehicle with a parking space recognition system with a memory device that is within the vehicle.

The invention also concerns a motor vehicle with a parking space recognition system with a memory device that is external to the vehicle, wherein the motor vehicle comprises the or one of the sensor devices and the or one of the computing devices of the parking space recognition system and is designed to establish a data connection to the memory device that is external to the vehicle. By means of the data connection, information can be transmitted between the motor vehicle, in particular the computing device, and the memory device. For example, the mentioned lengthwise park signal or the transverse park signal can be provided to the motor vehicle by the memory device. Information about the space recognized as a potential parking space can also be transmitted to the memory device by the computing device.

The invention also concerns a method for recognizing a parking space with a series of steps of the method. One step of the method for this is the detection of at least one surface extending along a direction of travel of a motor vehicle of at least one object in the surroundings of the motor vehicle by a sensor device of the motor vehicle. A further step of the method is the recognition by a computing device of the motor vehicle of a space between two detected surfaces extending along the direction of travel as a potential parking space with an associated parking space position, which can be at least one longitudinal parking space or at least one transverse parking space. Finally, identification of the recognized potential parking space depending on parking space information that is stored for the parking space position as a longitudinal parking space or as a transverse parking space or as a potential parking space, which can contain a longitudinal parking space and a transverse parking space, is carried out by a memory device as a further step of the method.

Advantages and advantageous embodiments of the method correspond here to advantages and advantageous embodiments of the parking space recognition system of the respective motor vehicle.

The features and combinations of features mentioned above in the description, and the features and combinations of features mentioned below in the description of the figures and/or shown in the figures alone can be used not only in the respectively specified combination, but also in other combinations or on their own without departing from the scope of the invention. Thus, embodiments of the invention that are not explicitly shown in the figures and are not described, but that result from and that can be produced by separate combinations of features from the described embodiments, are to be considered as included and disclosed. Embodiments and combinations of features that do not comprise all the features of an originally formulated independent claim are also to be considered as disclosed. Moreover, embodiments and combinations of features, in particular from the embodiments mentioned above, that go beyond the combinations of features laid out in the references of the claims or deviate therefrom are to be considered as disclosed.

Figure 2:
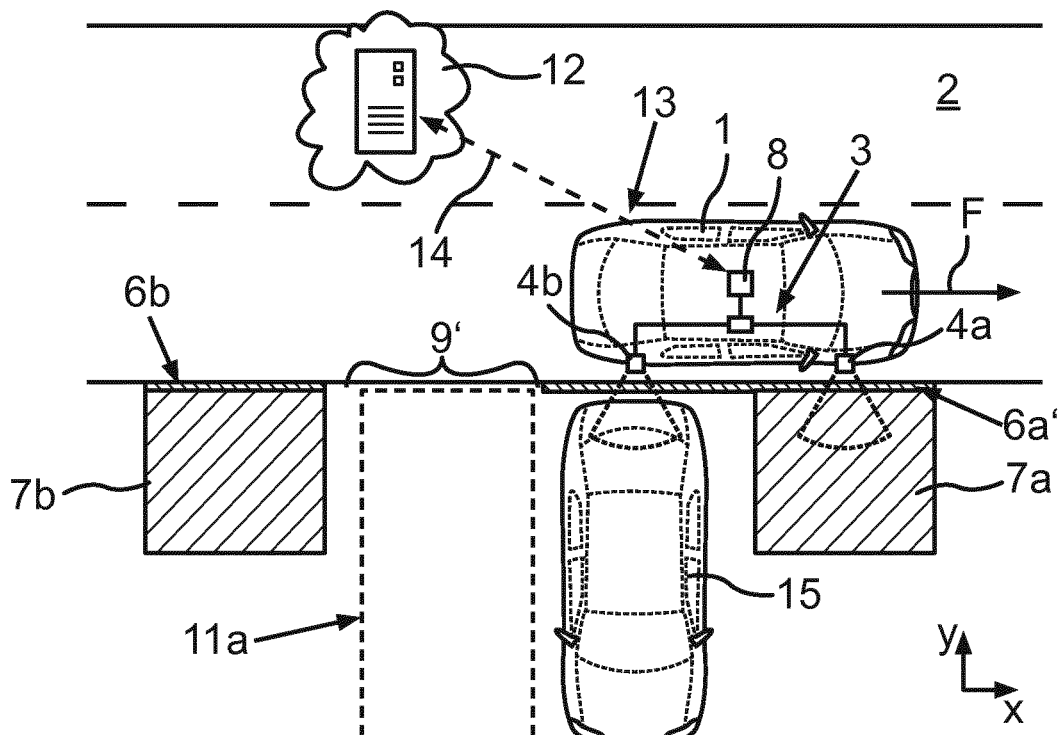

Exemplary embodiments of the invention are described in detail below using schematic drawings. In the figures:

FIG. 1 shows an example of a scenario with an example of an embodiment of a parking space recognition system for a motor vehicle in a bird's eye view; and FIG. 2 shows a further example of a scenario associated with the first example of the scenario of FIG. 1 in a bird's eye view.

Identical or functionally identical elements are provided with the same reference characters in the figures.

FIG. 1 shows a motor vehicle 1 that is moving on a road 2 in a direction of travel F. In the present case the motor vehicle 1 comprises a sensor device 3 that comprises two ultrasonic sensors 4a, 4b in the example shown, each of which has a lateral detection region 5a and 5b. The sensors 4a, 4b are implemented as ultrasonic sensors in the present case, and can thus detect respective surfaces 6a, 6b of a corresponding object 7a, 7b extending along the direction of travel F of the motor vehicle 1.

Here the motor vehicle 1 also comprises a computing device 8 that is designed to recognize a space 9 between two surfaces 6a, 6b detected in different positions of the motor vehicle and extending along the direction of travel F as a potential parking space with an associated parking space position, which can contain or can be at least one longitudinal parking space 10 with a main direction extending along the direction of travel F or at least one, in the present case two, transverse parking spaces 11a, 11b with a main direction extending transversely to the direction of travel F.

A memory device 12 is also shown that is designed to identify the recognized potential parking space as a longitudinal parking space 10 or a transverse parking space 11a, 11b depending on the parking space information stored for the parking space position, or even to identify it as a potential parking space, for example in the case of insufficient parking space information for recognition as a longitudinal or transverse parking space 10, 11a, 11b. In this case the memory device 12 is a part of the parking space recognition system 13 together with the computing device 8 and the sensor device 3.

In the example shown, the computing device 8 is also designed to directly recognize the space 9 detected between the two different positions of the motor vehicle 1 along the surfaces 6a, 6b extending in the direction of travel F as a transverse parking space 11a as an alternative to the recognition thereof as a potential parking space (FIG. 2). The memory device 12 is accordingly designed, if the transverse parking space 11a, 11b has been recognized as such, to store in the parking space information for the parking space position of the transverse parking space 11a, 11b that the parking space in said parking space position has been recognized as a transverse parking space 11a, 11b and, if the parking space has been recognized as a potential parking space, to store in the parking space information for the parking space position of the recognized parking space that the parking space in the parking space position has been recognized as a potential parking space.

In the scenario shown, the motor vehicle 1 is now driving in the direction of travel F past the objects 7a, 7b on the side of the road. In this case, in the example shown surfaces 6a, 6b that extend along the direction of travel F are continuously detected by the sensors 4a, 4b of the sensor device 3. Accordingly, an interruption of the respective surfaces 6a, 6b, i.e. the space 9, is recognized by the computing device 8 as a potential parking space, which in the example shown can be both a single longitudinal parking space 10 and two adjacent transverse parking spaces 11a, 11b. Because the respective detection regions 5a, 5b of the sensors 4a, 4b, in the present case transverse to the direction of travel F in a y-direction, are not sufficiently large to detect depth information in the y-direction in relation to the longitudinal parking space 10 or transverse parking spaces 11a, 11b, the computing device 8 cannot easily identify whether there is a longitudinal parking space 10 or there are two transverse parking spaces 11a, 11b in the space 9. Accordingly, a partially automatic or fully automatic or assisted parking process cannot easily be carried out here directly.

The necessary parking space information can however be called up from the memory device 12, for example over a wireless data connection 14. Relevant parking space information is placed or stored in the memory device 12 for the parking space position of the space 9 recognized as a parking space by the computing device 8. The parking space information can for example be placed in a map, in which all parking spaces are stored with the corresponding properties as a longitudinal parking space or transverse parking space or an indeterminate potential parking space, which can be both a longitudinal parking space and a transverse parking space. The recognized potential parking space can thus be correctly identified as a longitudinal parking space 10 or transverse parking spaces 11a, 11b.

In the example shown the motor vehicle 1 is however only driving past the space 9 and transmits corresponding parking space information to the memory device 12 that the space 9 has been recognized as a potential parking space. This is stored in the memory device 12.

In FIG. 2 a further example of a scenario is now shown in a bird's eye view. In this case, the motor vehicle 1 is again driving past the parking space position of FIG. 1. This may be the same motor vehicle 1 that has already driven past the objects 7a, 7b in the scenario shown in FIG. 1 at a previous point in time, or else a different motor vehicle 1 that is following the same path as the motor vehicle 1 in FIG. 1. In the example shown, the transverse parking space 11b is now occupied by a further vehicle 15. Accordingly, in the example shown, besides the surface 6b the sensor device 3 now also detects the surface 6a' extending along the direction of travel F, which is formed by the corresponding surface 6a (FIG. 1) of the object 7a, for example a flower box, and by the rear of the further vehicle 15 extending along the direction of travel F. Accordingly, in the example shown the computing device 8 identifies the space 9 between the surface 6a' and 6b, which is significantly smaller than the space 9 in FIG. 1. Accordingly, for the parking space position, which for example can be determined relative to the motor vehicle 1 from a position of the motor vehicle 1 known by a position detection system of the motor vehicle 1, the memory device 12 can now recognize that the space 9 that was recognized as a potential parking space (FIG. 1) in the scenario described above must not be longitudinal parking space 10, but rather must be two transverse parking spaces 11a, 11b. This is then stored in the parking space information in the memory device 12.

With the parking space information stored in the memory device 12, in a subsequent scenario, which is similar to the scenario shown in FIG. 1 and in which the two transverse parking spaces 11a, 11b are unoccupied, the motor vehicle 1 can thus recognize the space 9 (FIG. 1) as two transverse parking spaces 11a, 11b and for example can thus coordinate a partly automatic parking process in one of the two parking spaces 11a, 11b without errors.

The invention claimed is:

1. A parking space detection system for a motor vehicle, comprising:
a sensor device configured to detect at least one surface extending along a direction of travel of the motor vehicle of at least one object in the surroundings of the motor vehicle;
a computing device configured to recognize:
a space between two detected surfaces extending along the direction of travel as a potential parking space, and
a parking space position associated with the potential parking space,
wherein the potential parking space is at least one longitudinal parking space or at least one transverse parking space; and
a memory device configured to, when the computing device cannot determine whether the potential parking space is the at least one longitudinal parking space or the at least one transverse parking space based on the detection by the sensor device, identify the recognized potential parking space as one of the at least one longitudinal parking space or as the at least one transverse parking space based on stored parking space information for the parking space position,
wherein the memory device is coupled to a central memory device that is external to the motor vehicle, and the parking space recognition system comprises a number of sensor devices and computing devices that are within the motor vehicle and other motor vehicles,
wherein the central memory is common to the motor vehicle and the other motor vehicles, and
wherein the central memory device is configured to store the potential parking space centrally in a global map with other potential parking spaces, so that corresponding potential parking spaces are provided to the motor vehicle even in unknown surroundings or surroundings that are no longer navigated, and so that the potential parking space is identified as the at least one longitudinal parking space or as the at least one transverse parking space.

2. The parking space detection system according to claim 1, wherein the sensor device comprises an ultrasonic sensor device.

3. The parking space detection system according to claim 1, wherein:
the computing device is configured to recognize the space between the two detected surfaces extending along the direction of travel as the at least one transverse parking space alternatively to the recognition thereof as a potential parking space; and
the memory device is configured to:
when the space is recognized as the at least one transverse parking space, to store in the parking space information for the parking space position of the transverse parking space that the parking space in the parking space position has been recognized as a transverse parking space, and
when the space is recognized as the potential parking space, to store in the parking space information for the parking space position of the recognized parking space that the space in the parking space position has been recognized as a potential parking space.

4. The parking space detection system according to claim 1, wherein the memory device is configured to store in the parking space information for at least one respective parking space position a frequency for how often one of the potential parking space and/or the transverse parking space and/or the longitudinal parking space has been recognized for the parking space position and to associate the transverse parking space or the longitudinal parking space or the potential parking space with the parking space position depending on the stored frequency.

5. The parking space detection system according to claim 4, wherein the memory device associates the parking space position of an indeterminate parking space, which is adjacent to the transverse parking space or the longitudinal parking space, with a transverse parking space or a longitudinal parking space.

6. The parking space detection system according to claim 1, wherein the parking space information is placed on a map with at least one further item of map information, wherein the further item of map information comprises length information and/or depth information of at least one parking area.

7. The parking space detection system according to claim 1, wherein the sensor device is configured for automatic and continuous detection of the space and the computing device is configured for automatic continuous recognition.

8. The parking space detection system according to claim 1, wherein the memory device is within the motor vehicle.

9. A motor vehicle with a parking space recognition system according to claim 1.

10. A method for detecting a parking space, comprising:
- detecting at least one surface of at least one object extending along a direction of travel of a motor vehicle in the surroundings of the motor vehicle by a sensor device of the motor vehicle;
- recognition by a computing device of the motor vehicle of:
  - a space between two detected surfaces extending along the direction of travel as a potential parking space; and
  - a parking space position associated with the potential parking space,
  wherein the potential parking space is at least one longitudinal parking space or at least one transverse parking space;
- identification by a memory device coupled to a central memory device that is external to the motor vehicle, wherein the central memory is common to the motor vehicle and other motor vehicles, when the computing device cannot determine whether the potential parking space is the at least one longitudinal parking space or the at least one transverse parking space based on the detection by the sensor device, of the recognized indeterminate parking space as a longitudinal parking space or as a transverse parking space based on parking space information stored for the parking space position; and
- storing, by the central memory, the potential parking space centrally in a global map with other potential parking spaces, so that corresponding potential parking spaces are provided to the motor vehicle even in unknown surroundings or surroundings that are no longer navigated, and so that the potential parking space is identified as the at least one longitudinal parking space or as the at least one transverse parking space.

* * * * *